United States Patent [19]

Su

[11] Patent Number: 6,041,696

[45] Date of Patent: *Mar. 28, 2000

[54] STRUCTURE OF AN APPARATUS FOR DEHYDRATING FRUITS, VEGETABLES AND FOODS

[76] Inventor: Yung-Sen Su, P.O. Box 82-144, Taipei, Taiwan

[ * ] Notice: Under 35 U.S.C. 154(b), the term of this patent shall be extended for 394 days.

[21] Appl. No.: 09/285,444

[22] Filed: Apr. 2, 1999

[51] Int. Cl.⁷ ............................. A23L 3/16; F26B 11/18; F26B 23/06; F26B 25/18
[52] U.S. Cl. ................................. 99/483; 34/197; 34/211; 99/476
[58] Field of Search ............................ 99/340, 448, 450, 99/467, 468, 473–476, 416, 417, 410, 483; 34/196, 197, 211, 238; 126/21 A, 369; 219/400, 401, 521, 385–387; 426/520–523, 510, 511

[56] References Cited

U.S. PATENT DOCUMENTS

| | | |
|---|---|---|
| 3,943,842 | 3/1976 | Bills et al. .............................. 99/476 X |
| 4,152,842 | 5/1979 | Laughlin ............................. 219/400 X |
| 4,190,965 | 3/1980 | Erickson ............................... 34/197 X |
| 4,215,004 | 7/1980 | Su .............................................. 99/483 |
| 4,531,306 | 7/1985 | Erickson ................................ 99/483 X |
| 4,536,643 | 8/1985 | Erickson ................................ 34/197 X |
| 5,235,906 | 8/1993 | Hsu ............................................. 99/483 |
| 5,311,673 | 5/1994 | Su ........................................ 99/483 X |
| 5,379,527 | 1/1995 | Su ........................................ 99/483 X |
| 5,423,249 | 6/1995 | Meyer ....................................... 99/483 |
| 5,437,108 | 8/1995 | Alseth .................................... 34/197 X |
| 5,458,050 | 10/1995 | Su ........................................ 99/483 X |
| 5,826,498 | 10/1998 | Su ............................................ 99/476 |

*Primary Examiner*—Timothy Simone
*Attorney, Agent, or Firm*—A & J

[57] ABSTRACT

An apparatus for dehydrating fruits, vegetables and foods includes a base having a top formed with a center hole and two opposite vertical recesses close to two sides, the base having two opposite through holes at two opposite lower corners in communication with the two recesses, a cover having a bottom formed with two holes at two opposite sides thereof, a pair of positioning plates each having a top formed with a projection configured to engage with the holes of the cover, an inner side formed with a plurality of parallel grooves, and a lower edge with a hook engageable with a respective one of the through holes, and a plurality of trays each having a lower portion formed with two opposite flanges configured to slidably engage with respective grooves of the positioning plates.

1 Claim, 8 Drawing Sheets

PRIOR ART
FIG. 8

STRUCTURE OF AN APPARATUS FOR DEHYDRATING FRUITS, VEGETABLES AND FOODS

BACKGROUND OF THE INVENTION

1. Field of the Invention

This invention is related to an improvement in the structure of an apparatus for dehydrating fruits, vegetables and foods.

2. Description of the Prior Art

Figure 8:
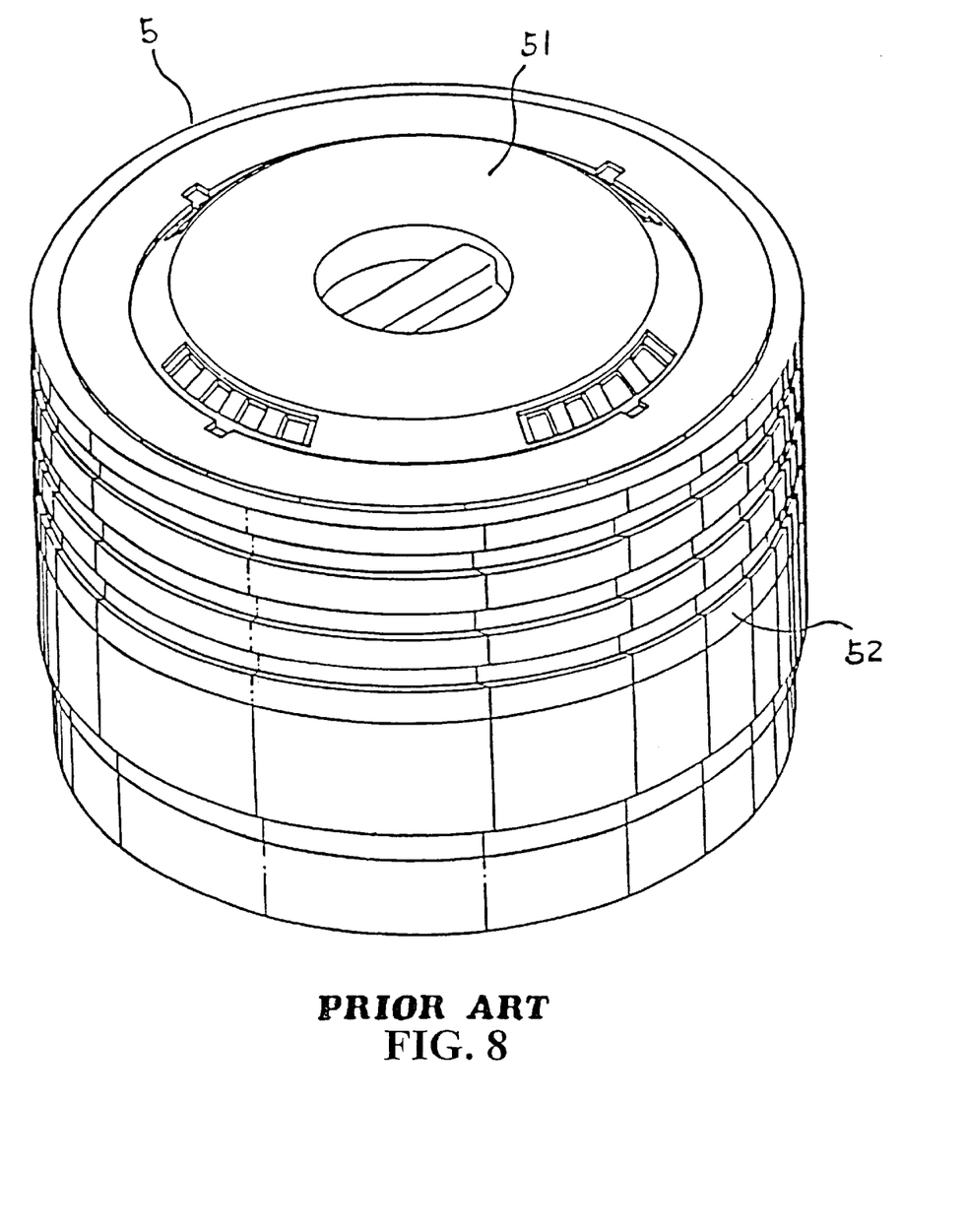
FIG. 8 is a perspective view of a prior art dehydrating device.

Referring to FIG. 8, the conventional dehydrating device 5 generally includes a plurality of trays 52 arranged into a stack and a cover 51 mounted on the uppermost one of the trays 52. However, it is often necessary to remove the trays 52 one by one in order to get the desired food from the dehydrating device 5 and stack up the trays 52 again after use thereby causing a lot of trouble in use. Furthermore, such a dehydrating device 5 is fixed in size and bulky in volume thus causing much inconvenience in transportation and making it difficult to stow when not in use.

Therefore, it is an object of the present invention to provide an improvement in the structure of an apparatus for dehydrating fruits, vegetables and foods which can obviate and mitigate the above-mentioned drawbacks.

SUMMARY OF THE INVENTION

This invention is related to an improvement in the structure of an apparatus for dehydrating fruits, vegetables and foods.

It is the primary object of the present invention to provide an improvement in the structure of an apparatus for dehydrating fruits, vegetables and foods which can be readily assembled.

It is another object of the present invention to provide an improvement in the structure of an apparatus for dehydrating fruits, vegetables and foods which is compact in size.

It is still another object of the present invention to provide an improvement in the structure of an apparatus for dehydrating fruits, vegetables and foods which is easy to use.

It is still another object of the present invention to provide an improvement in the structure of an apparatus for dehydrating fruits, vegetables and foods which is simple in construction.

It is a further object of the present invention to provide an improvement in the structure of an apparatus for dehydrating fruits, vegetables and foods which is inexpensive to manufacture.

According to a preferred embodiment of the present invention, an apparatus for dehydrating fruits, vegetables and foods includes a base having a top formed with a center hole and two opposite vertical recesses close to two sides, the base having two opposite through holes at two opposite lower corners in communication with the two recesses, a cover having a bottom formed with two holes at two opposite sides thereof, a pair of positioning plates each having a top formed with a projection configured to engage with the holes of the cover, an inner side formed with a plurality of parallel grooves, and a lower edge with a hook engageable with a respective one of the through holes, and a plurality of trays each having a lower portion formed with two opposite flanges configured to slidably engage with respective grooves of the positioning plates.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIGS. 1, 2, 3 and 4, the present invention generally comprises a cover 1, a plurality of trays 2, a pair of positioning plates 3, and a base 4. The cover 1 has a bottom formed with two holes 11 at two opposite sides thereof. The tray 2 is formed with an opening 22 at the center thereof for the passage of air and a handle 21 that one uses for opening it. Further, the tray 2 has two opposite flanges 20 at the lower portion. The positioning plate 3 has a projection 35 at the top configured to fit into the hole 11 of the cover 1 and a plurality of parallel grooves 34 at the inner side configured to receive the edge of the tray 2 thus enabling the tray 2 to be moved with respect thereto. The lower edge of the lower portion 31 of the positioning plate 3 has two slots 33 and a hook 32 disposed between the two slots 33. The base 4 is provided with a hot air blower (not shown) therein and has an opening 41 at the center for the passage of the air generated by the hot air blower. The base 4 has a top formed with two vertical recesses 42 close to two opposite sides thereof and two through holes 421 at two opposite lower corners in communication with the two vertical recesses 42. The lower portion 31 of the positioning plate 3 is fitted into the vertical recess 42 with its hook 32 engaged with the through hole 421. A power switch 43 is mounted at the front side of the base 4.

Figure 1:
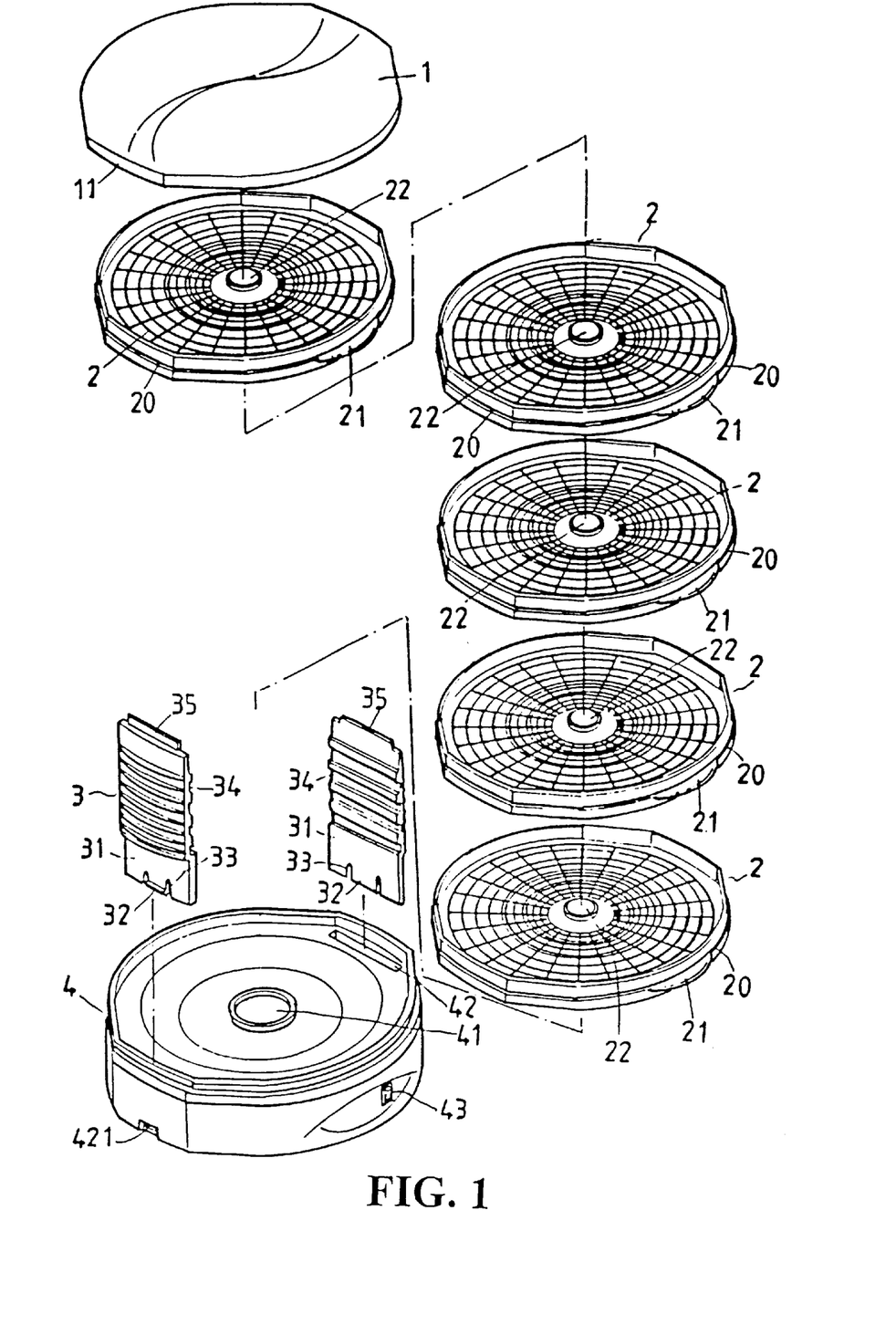
FIG. 1 is an exploded view of the present invention.
Figure 2:
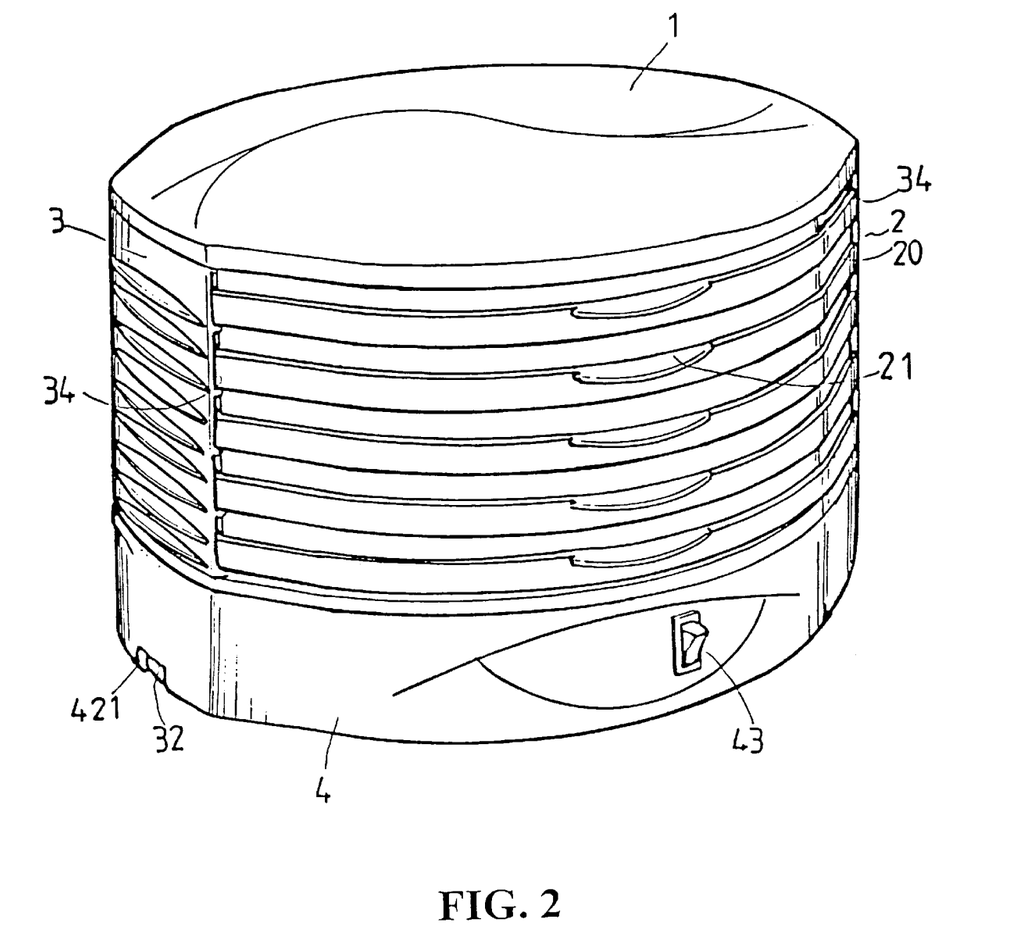
FIG. 2 is a perspective view of the present invention.
Figure 3:
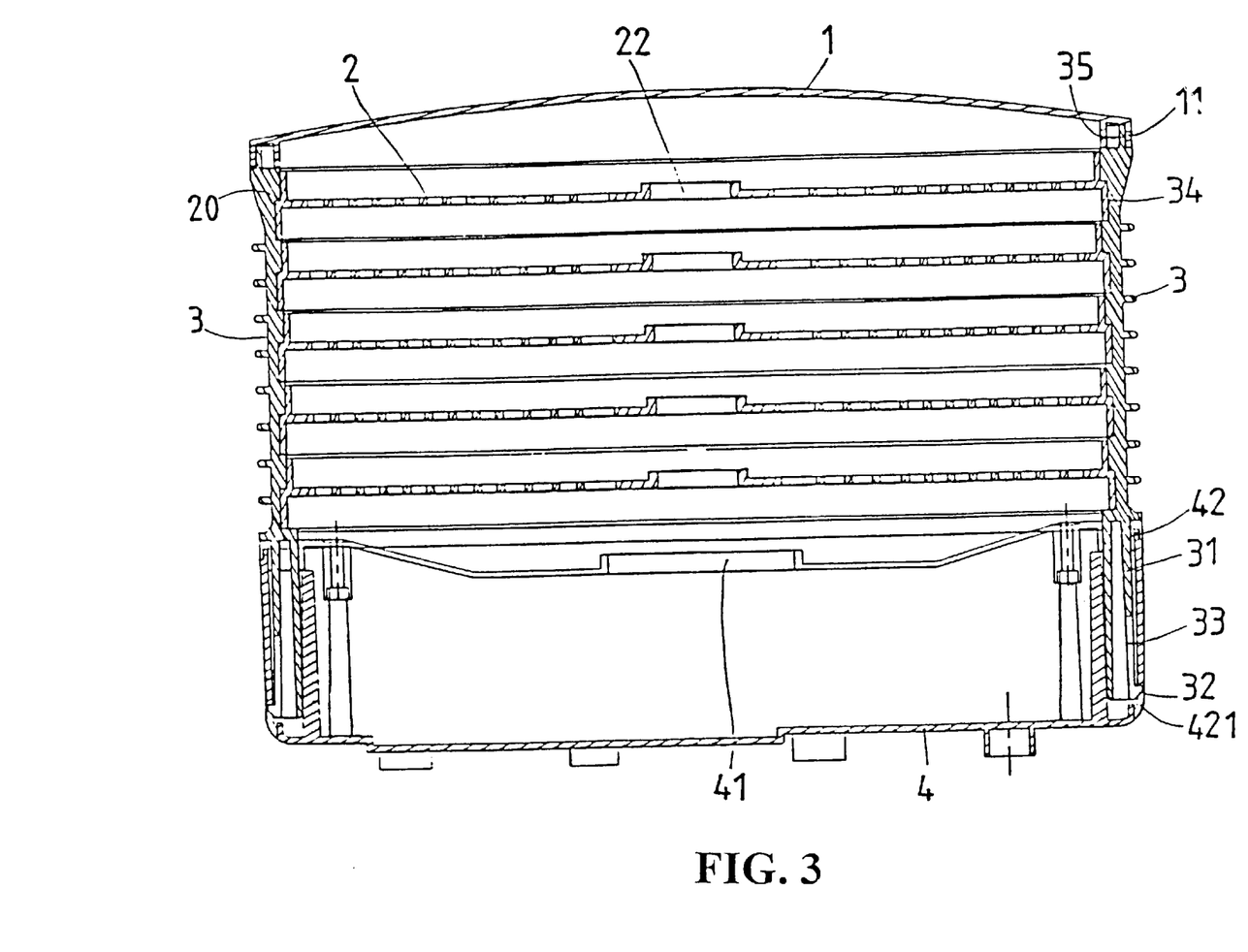
FIG. 3 is a cross sectional view of the present invention.
Figure 4:
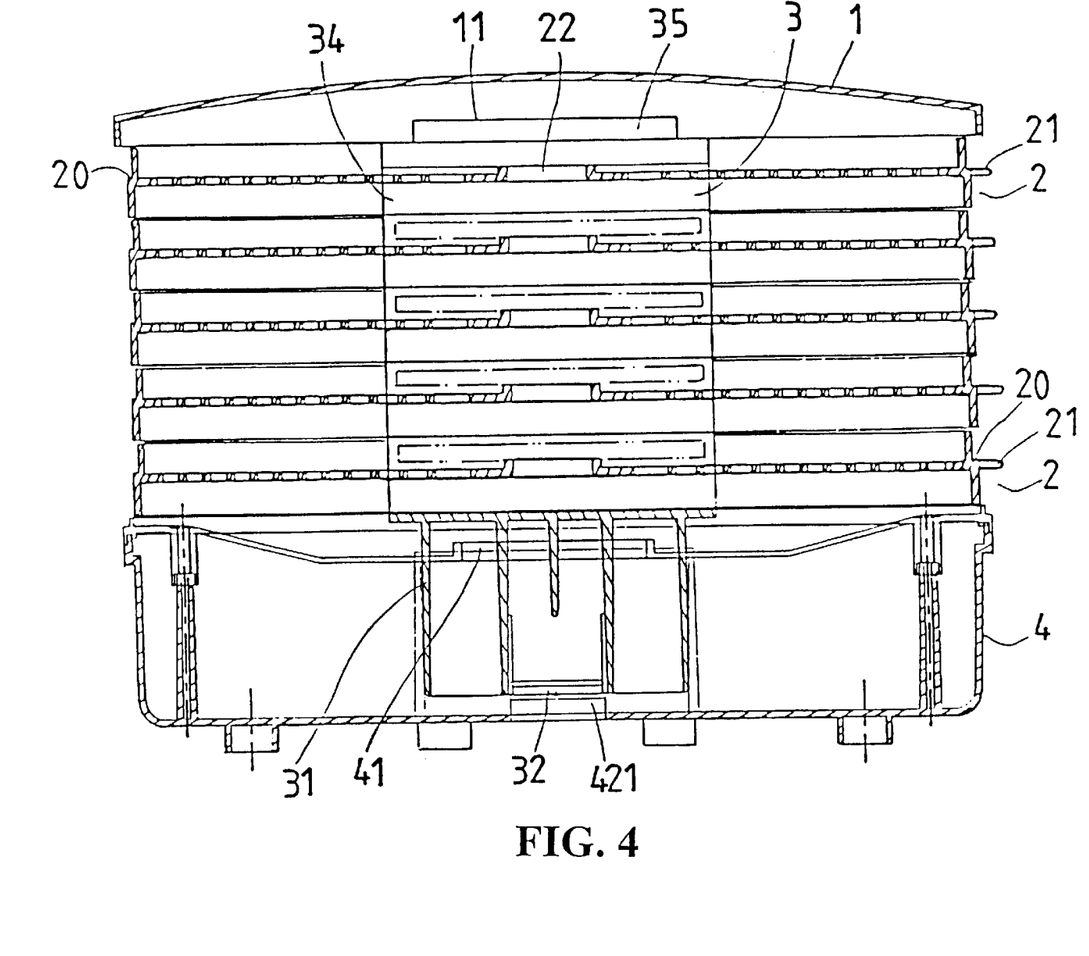
FIG. 4 is a longitudinal sectional view of the present invention.
Figure 5:
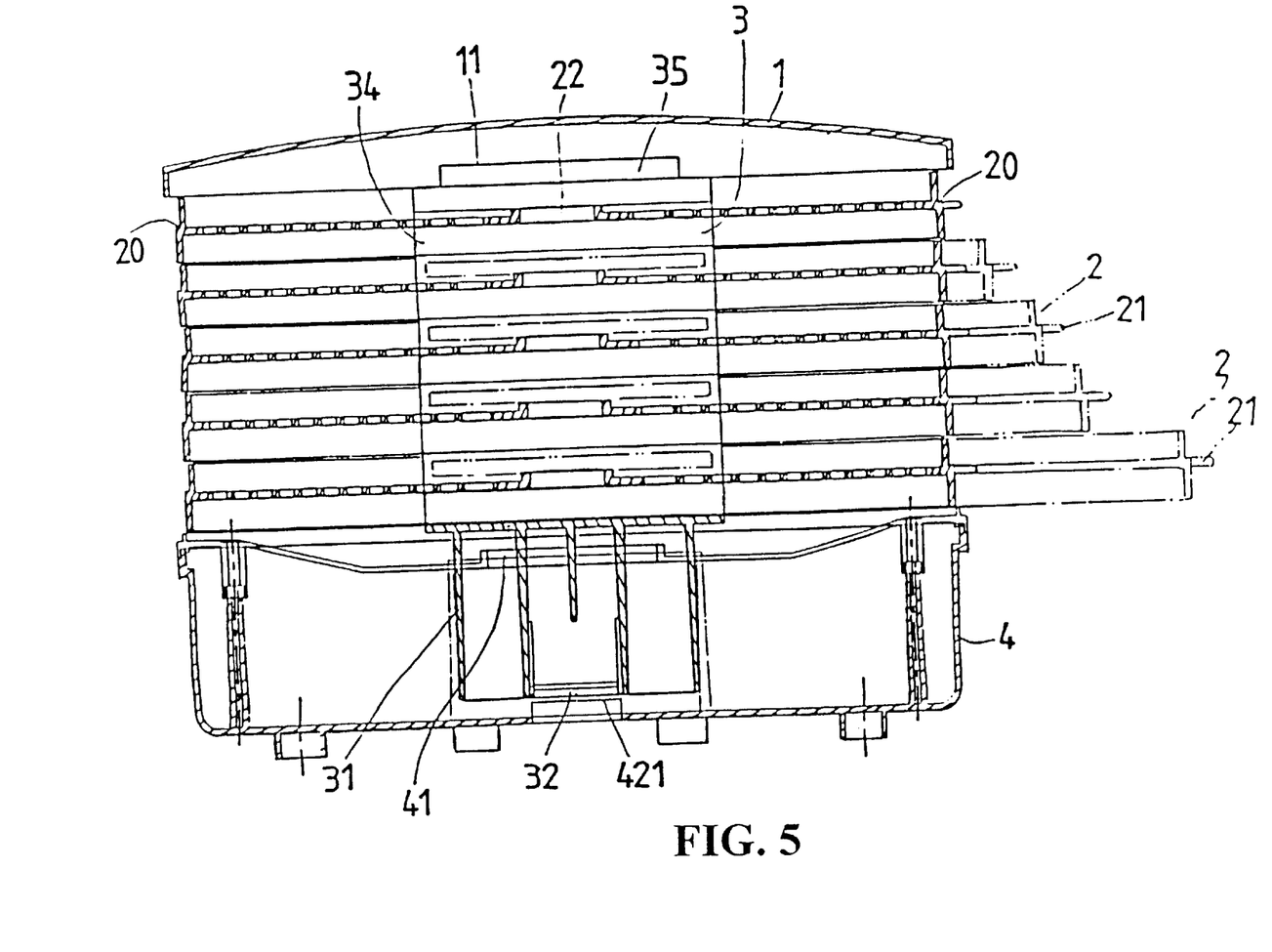
FIG. 5 is a sectional view illustrating how the trays are pulled open.
Figure 6:
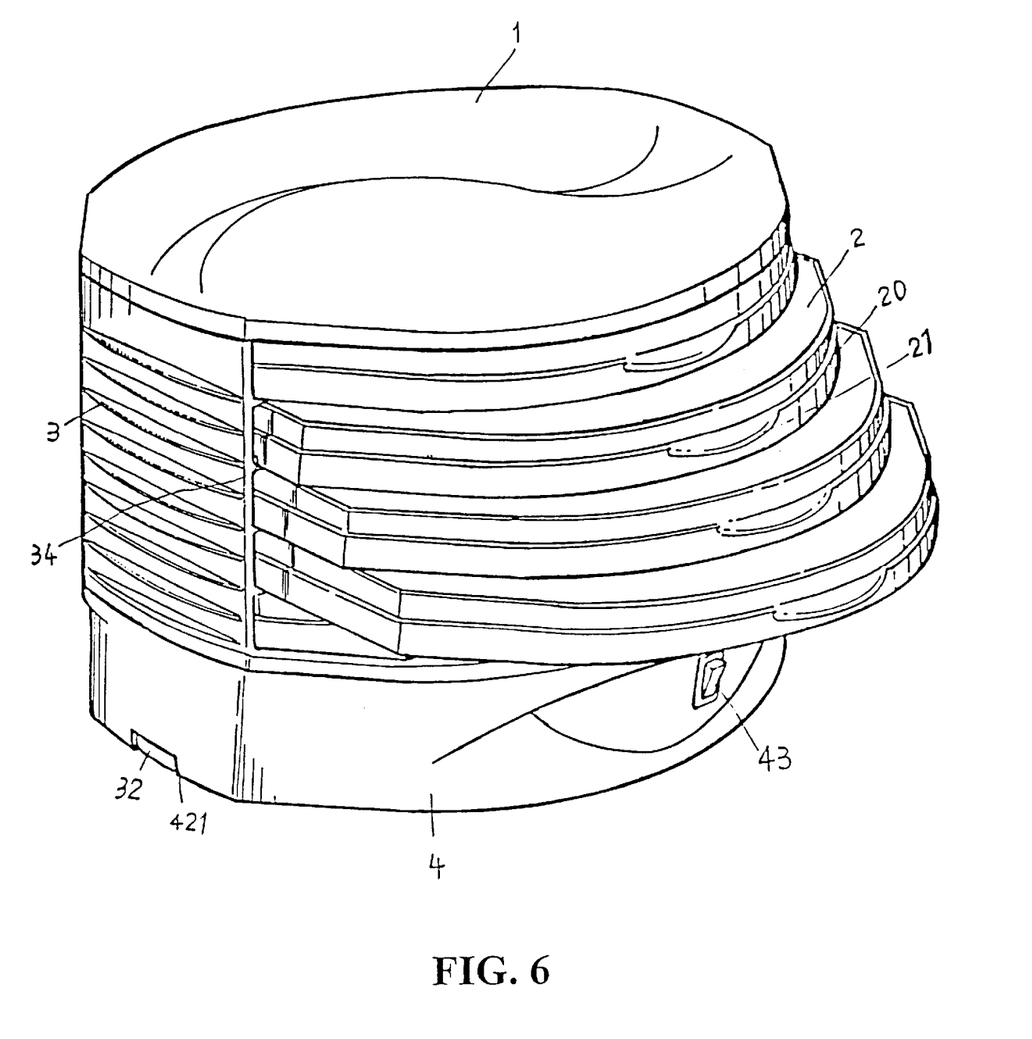
FIG. 6 is a perspective view illustrating how the trays are pulled open.
Figure 7:
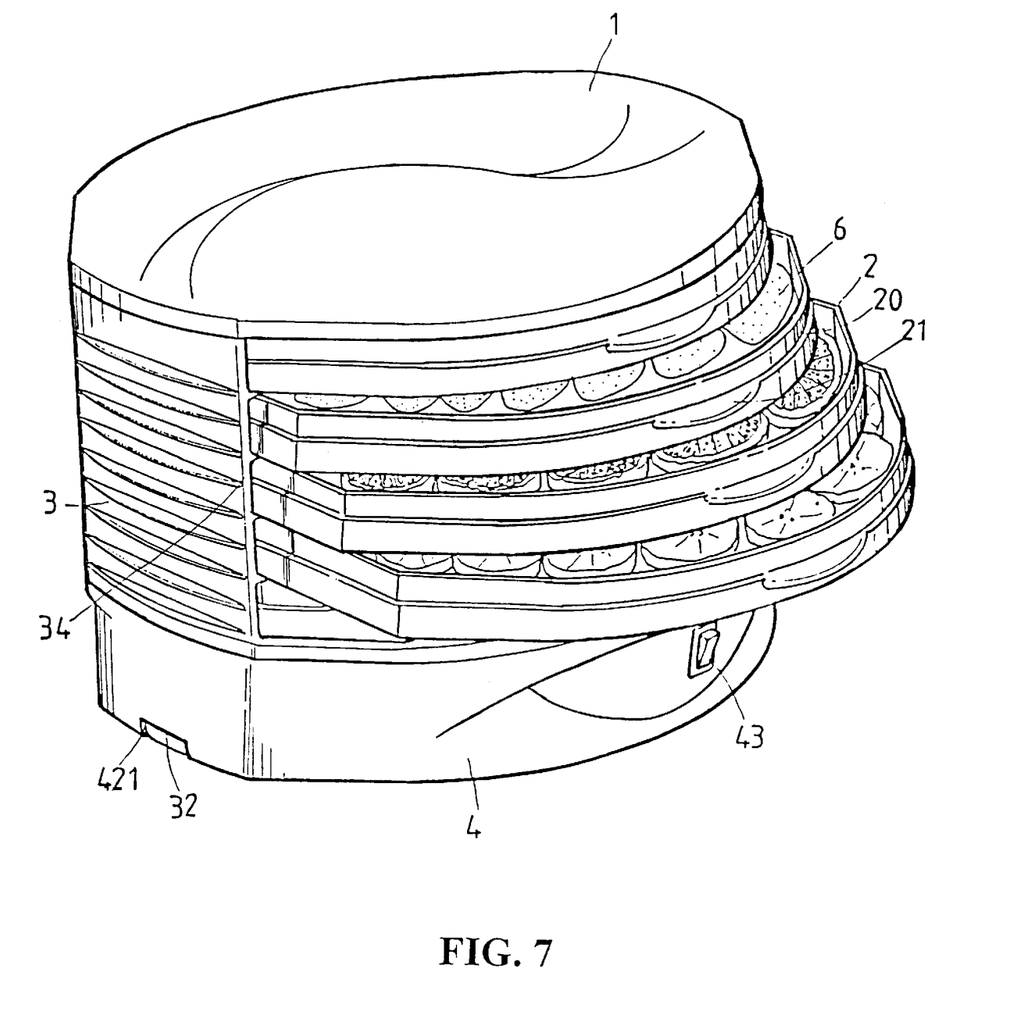
FIG. 7 is a working view of the present invention.

Referring to FIGS. 5 and 6, when in assembly, it is only necessary to insert the lower portions 31 of the positioning plates 3 into respective recesses 42 of the base 4 so that the hooks 32 engage with the holes 421. Meanwhile, the grooves 34 of one of the positioning plates 35 are located opposite to those of the other one of the positioning plates 35 so that the enabling the trays 2 to be slidably fitted therein. Then, the cover 1 is arranged on the positioning plates 3 with the holes 11 engaged with the projections 35. When in use, the hot air blower will produce hot air which will flow out of the base 4 and then flow through the trays 2 via the openings 22 thereby dehydrating the foods in the trays 2 (see FIGS. 4, 5, 6 and 7).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An apparatus for dehydrating fruits, vegetables and foods comprising:

a base having a top formed with a center hole and two opposite vertical recesses close to two sides, said base having two opposite through holes at two opposite lower corners in communication with said two recesses;

a cover having a bottom formed with two holes at two opposite sides thereof;

a pair of positioning plates each having a top formed with a projection configured to engage with said holes of said cover, an inner side formed with a plurality of parallel grooves, and a lower edge with a hook engageable with a respective one of said through holes; and a plurality of trays each having a lower portion formed with two opposite flanges configured to slidably engage with respective grooves of said positioning plates.

* * * * *